3,014,261
FASTENING MEANS FOR LININGS OF BURIAL CASKETS
Walter K. Nelson, Parkview Drive, R.D. 7, Pittsburgh 29, Pa.
Filed Mar. 27, 1959, Ser. No. 802,537
1 Claim. (Cl. 27—19)

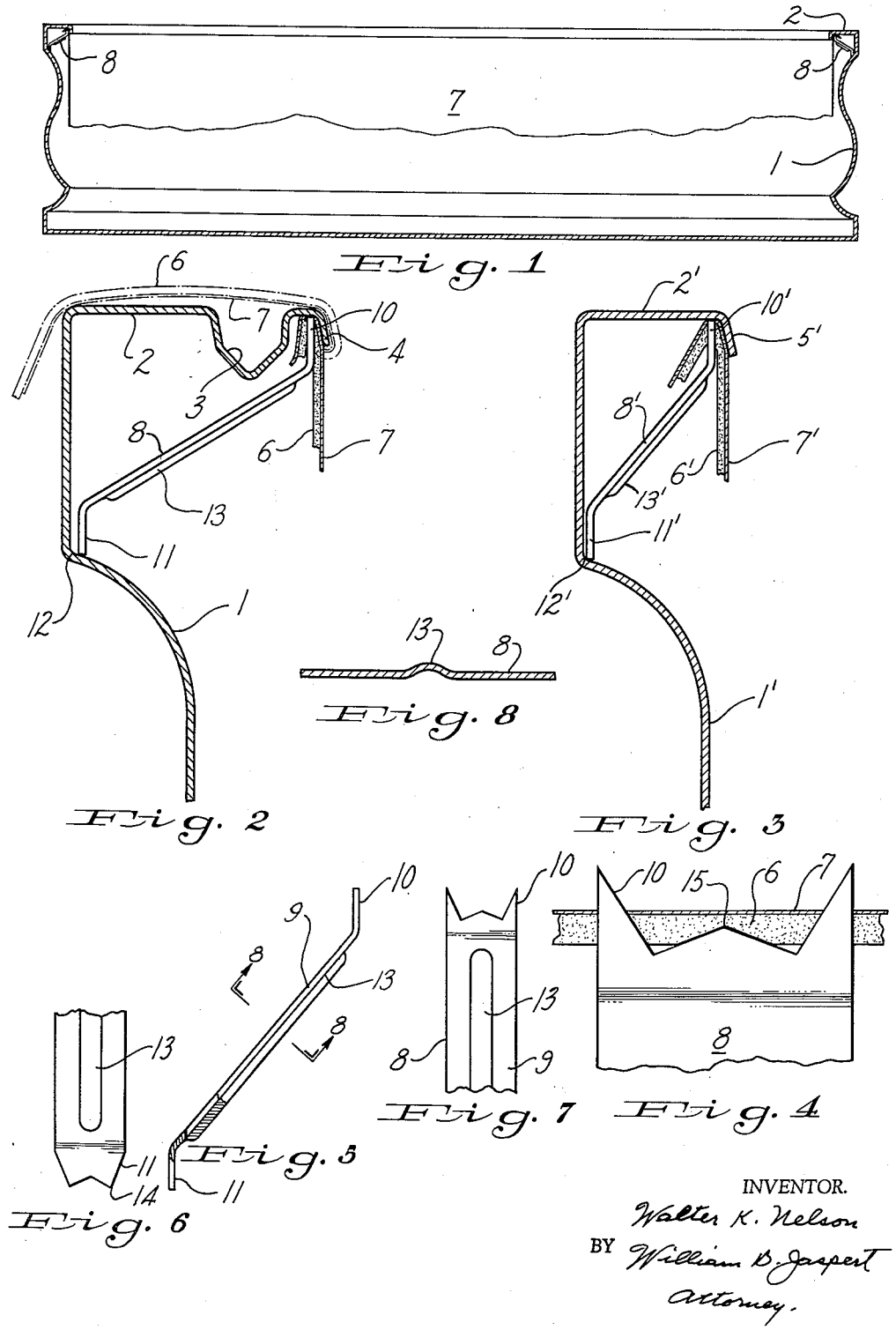
Dec. 26, 1961     W. K. NELSON     3,014,261
FASTENING MEANS FOR LININGS OF BURIAL CASKETS
Filed March 27, 1959
INVENTOR.
Walter K. Nelson
BY William B. Jaspert
Attorney.

This invention relates to new and useful improvements in means for attaching the interior cloth finish or lining material to metal burial caskets and it is among the objects thereof to provide attaching clips having points for piercing the lining fabric and means for securing them in position without the need for wood or fibrous tacking strips in conventional use.

It is a further object of the invention to provide a simple form of fastening clip for attaching fabric lining material to the inside of burial caskets in an efficient and expedient manner without the need for supplemental attaching means.

It is a further object of the invention to provide fastening clips for casket finishes or linings which are of a shape to frictionally engage and interlock with portions of the casket body to which the lining material is attached.

These and other objects of the invention will become more apparent from a consideration of the accompanying drawing constituting a part hereof in which like reference characters designate like parts and in which:

FIGURE 1 is a vertical cross-sectional view taken longitudinally of a burial casket employing fastening means for the lining fabrics embodying the principles of this invention;

FIGURE 2 is a cross-sectional view, partially in elevation, of a sealer type flange of a burial casket showing the fastening clips in position;

FIGURE 3, a similar view of a modified form of casket flange and clip;

FIGURE 4, an enlarged detail of a portion of the fastening clip and lining fabric showing the points of the clip piercing the fabric;

FIGURE 5, a side elevational view, partially in cross section, of the clip;

FIGURE 6, a top plan view of the lower portion of the fastening clip;

FIGURE 7, a top plan view of the upper portion of the fastening clip; and

FIGURE 8, a cross-sectional view taken along the line 8—8 of FIGURE 5.

With reference to the several figures of the drawing, the numeral 1 designates the end walls of a sheet metal burial casket having a flange 2 extending around the entire upper periphery on the interior thereof. FIGURES 2 and 3 illustrate two different types of flanges, the flange 2 in FIGURE 2 having a recess or groove 3 for receiving a resilient sealer strip which is no part of the present invention. A lip 4 extends beyond the sealer strip groove 3. In FIGURE 3, the flange 2' is provided with a lip 5'. Heretofore, wooden strips, not shown, were attached to the flanges 2' and the lining material or fabric was attached to the casket by tacking them to the wooden strips.

In accordance with the present invention, the lining material which may consist of a heavy backing material 6, FIGURE 2 and a satin or silk finish material 7, is secured to the casket body by means of clips 8 which, as shown in FIGURE 5, have a straight body portion 9 and a plurality of piercing points 10 that pierce the material 6 and 7, as shown in FIGURE 4, and an oppositely disposed tail portion 11, the clips being disposed between the flange 2 and 2' and a shoulder portion 12 and 12', FIGURES 2 and 3 respectively. Clips 8 and 8' are provided with a reinforcing bead 13 and 13' respectively which makes it more or less rigid but allows the upturned piercing points 10 and 10' and the tail portion 11 and 11' to more or less interlock with the flange 2 and 2' and the shoulder 12, 12'. Tail portion 11 is resiliently engaged with shoulder 12 which holds the clip in position because the upturned piercing points 10 press the lining material 6 and 7 against the lip 4 of the flange 2 and the tail portion 11 has a saw-tooth shaped end 14, FIGURE 6, that tends to dig into the surface of the shoulder portion 12 to prevent displacement of the clip.

In the type of clip used in FIGURE 3, the piercing points 10' and tail portion 11' are the same, as in FIGURE 2, but the overall size of the clip is smaller than that used in FIGURE 2 because the flange 2' is not as wide as when a sealer groove 3 is employed in the flange.

As shown in FIGURE 4, the piercing points 10 pierce the material 6 and 7 making it impossible to displace the material once it has been secured against the lip 4 of flange 2 in the manner shown in FIGURE 2. The piercing points 10' of clips 8' have a similar coaction with materials 6' and 7' in the manner shown in FIGURE 3.

By means of the fastening clips 8, which are produced by a simple and single punching operation, the lining or finished fabrics of a casket can readily be secured to a metal casket frame and cannot be pulled away from the frame without tearing the cloth or lining material.

As shown in dotted lines in FIGURE 2, the cloth material 6 and 7 may be folded back over the flange of the casket while the fastening clips 8 are applied to provide access to the flange in mounting the clips between the shoulder 12 and the flange 2.

As shown in FIGURE 4, the double tooth piercing elements 10 are punched out with a tooth-like element 15 therebetween, which also engages although it does not pierce the heavy lining material 6.

Metal fastening clips of the type herein shown and described simplify casket manufacture by eliminating the need for wood or fiber strips and the labor for attaching the same to the casket body.

Although one embodiment of the invention has been herein illustrated and described, it will be evident to those skilled in the art that various modifications may be made in the details of construction without departing from the principles herein set forth.

I claim:

In a sheet metal burial casket having inturned peripheral flanges with a depending lip and having a shoulder below the flanges opposite said lip, means for fastening fabric lining material on the interior of the casket adjacent said lip which consists of clips having a rigid body portion having oppositely disposed flaring ends with a piercing point at one end for engaging the lining material and having their other end shaped to engage said shoulder to abut the inner face of the lip and the inner face of the casket upon the said shoulder to hold the clips in position by spring action of said ends.

References Cited in the file of this patent
UNITED STATES PATENTS

| 936,855 | Best | Oct. 12, 1909 |
| 1,171,952 | Higgin | Feb. 15, 1916 |
| 2,044,967 | Bowler | June 23, 1936 |
| 2,739,022 | Hinz | Mar. 20, 1956 |